United States Patent [19]

Pigasse

[11] 4,439,238

[45] Mar. 27, 1984

[54] COPPER PHTHALOCYANINE PIGMENTS THEIR PREPARATION PROCESS AND THEIR USE

[75] Inventor: Daniel Pigasse, Rouen, France

[73] Assignee: I.C.I. Francolor S.A., Cedex, France

[21] Appl. No.: 431,931

[22] Filed: Sep. 30, 1982

Related U.S. Application Data

[63] Continuation of Ser. No. 249,520, Mar. 31, 1981, abandoned.

[30] Foreign Application Priority Data

Apr. 18, 1980 [FR] France ................. 80 08722

[51] Int. Cl.$^3$ .............................................. C09D 11/00
[52] U.S. Cl. .................. 106/20; 106/288 Q; 106/308 N; 106/22; 260/245.72; 260/245.85; 260/245.87
[58] Field of Search ................ 106/288 Q, 308 N, 19, 106/22, 20, 243; 260/245.72, 245.85, 245.87

[56] References Cited

U.S. PATENT DOCUMENTS

| | | | |
|---|---|---|---|
| 2,699,442 | 1/1955 | Eastes | 260/314.5 |
| 4,141,904 | 2/1979 | Cabut et al. | 260/314.5 |
| 4,196,016 | 4/1980 | Simon | 106/309 |
| 4,298,526 | 11/1981 | Sappok et al. | 106/288 Q |

FOREIGN PATENT DOCUMENTS

| | | |
|---|---|---|
| 930648 | 7/1955 | Fed. Rep. of Germany . |
| 1428172 | 1/1966 | France . |
| 90862 | 3/1968 | France . |
| 1538270 | 8/1968 | France . |
| 1234067 | 6/1971 | United Kingdom . |
| 1299439 | 12/1972 | United Kingdom . |

OTHER PUBLICATIONS

"The Chemistry of Synthesic Dyes and Pigments" pp. 582, 583.
"Phthalocyanine Compounds" Moser; F. H., & Thomas; A. L., pp. 152 & 162, 1963.

Primary Examiner—Theodore Morris
Attorney, Agent, or Firm—Beveridge, DeGrandi & Kline

[57] ABSTRACT

The invention relates to copper phthalocyanine pigments, characterized in that they have a specific surface according to BET of between 15 to 65 m$^2$/g and a $\beta$ form content of between 3 and 85%, and in that they contain up to 10% of a fatty amine or a mixture of fatty amines of the formula:

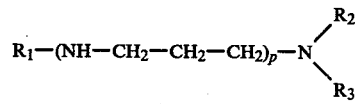

in which $R_1$ represents a non-aromatic, $C_1$ to $C_{22}$ aliphatic or alicyclic hydrocarbon chain, $R_2$ represents hydrogen or a non-aromatic, $C_1$ to $C_{22}$ aliphatic or alicyclic hydrocarbon chain, the sum of the carbon atoms of chains $R_1$ and $R_2$ is between 6 and 50, $R_3$ represents hydrogen or a $C_1$ to $C_4$ aliphatic radical, and p varies from 0 to 20.

The invention also relates to a process for preparing these pigments and processes for their use for the coloration of inks, paints, plastics materials, textiles and leathers and coating of various substrates.

18 Claims, No Drawings

COPPER PHTHALOCYANINE PIGMENTS THEIR PREPARATION PROCESS AND THEIR USE

This is a continuation of application Ser. No. 249,520, filed Mar. 31, 1981, now abandoned.

The present invention relates to copper phthalocyanine pigments, their production process and their use.

Copper phthalocyanine, such as is obtained from synthesis thereof, is generally constituted by large, well-crystallized particles, whose size is largely greater than the micron, and does not have any pigmentary power, i.e. is not capable of being used to color, for example, an ink, a paint or a plastics material.

To have a satisfactory coloring power, the copper phthalocyanine pigment must have a particle size largely lower than the micron, generally between 0.02 and 0.5 micron.

One of the means for reducing the particle size is the grinding of copper phthalocyanine in the presence of a large quantity of mineral substrate; thus, in the process described in U.S. Pat. No. 3,030,370, 1 part of copper phthalocyanine in the presence of 4 to 10 parts of aluminum sulfate is ground with a small quantity (0.1 to 0.4 part) of a crystallizing solvent to ensure conversion to the $\beta$ form (greenish shade). After grinding, the mixture is treated in a heated state in a dilute acid medium to eliminate the mineral substrate.

Another method of conditioning copper phthalocyanine is grinding without mineral substrate. In this case, described for example in U.S. Pat. No. 2,857,400, copper phthalocyanine is ground a first time without mineral substrate, and this results in obtaining a ground product without any pigmentary value because it is highly agglomerated; the ground copper phthalocyanine is treated a second time in a large quantity of solvent (at least 4 parts of solvent per 1 part of copper phthalocyanine) with intense stirring to disagglomerate the ground copper phthalocyanine.

This second process is less polluting than the first since it does not comprise the elimination of a large quantity of mineral charge; in addition, the grinding phase is more economical since the charge in the grinder comprises only copper phthalocyanine. However, this process has the disadvantage of necessitating large quantities of solvents.

High value copper phthalocyanine pigments have now been found which are prepared by economical means, without grinding with a large quantity of salt or treatment with a large quantity of solvent.

The present invention relates to copper phthalocyanine pigments characterized in that they have a specific surface of between 15 and 65 m²/g (determined by the BET method) and a $\beta$ form content of between 3 and 85% (determined by X-ray analysis), and in that they contain up to 10% by weight of a fatty amine or a mixture of fatty amines of formula (I):

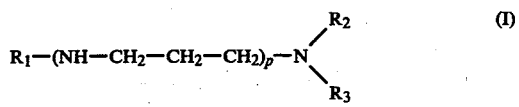

in which $R_1$ designates a non-aromatic, $C_1$ to $C_{22}$ aliphatic or alicyclic hydrocarbon chain, i.e., a hydrocarbon chain containing from 1 to 22 carbon atoms, $R_2$ designates hydrogen or a non-aromatic, $C_1$ to $C_{22}$ aliphatic or alicyclic hydrocarbon chain, the sum of the carbon atoms of chains $R_1$ and $R_2$ is between 6 and 50, $R_3$ designates hydrogen or a $C_1$ to $C_4$ aliphatic radical, and p is a whole number which may vary from 0 to 20 and preferably from 0 to 4.

The BET method is defined in DIN 66 131 as the determination of specific surface area of solids by the method of Brunauer, Emmett and Teller (BET) as described in the Journal of the American Chemical Society, 60 (1938) pp. 309–319.

The mixtures of amines with an aliphatic radical $R_1$ or $R_2$ may be industrial mixtures such as those sold under the names of NORAM, DINORAM, TRINORAM and POLYNORAM by the Prochinor Department of Pierrefitte Auby.

As an example of an amine with an alicyclic radical, an amine derivative of colophany, such as the Rosin Amines of Hercules, may be mentioned.

The halogen content, mainly chlorine or bromine, in copper phthalocyanine pigments varies from 0 to 5% by weight.

The pigments according to the invention possibly contain 1 to 10% by weight relative to pure copper phthalocyanine, and preferably 2 to 5% by weight of one or more non-volatile compounds comprising a hydrocarbon chain of 6 to 22 carbon atoms and one or more polar functions, for example, of the acid, alcohol, ester, amide, ketone or ether-oxide type. Listed amongst these compounds may be oleic acid, stearic acid, lauric alcohol, cetyl alcohol, and glycerol oleate or stearate. In this case, the overall content of amine plus non-volatile compound must not exceed 12% by weight relative to pure phthalocyanine.

Within the scope of the invention, it is possible to incorporate with the pigments a small quantity of any copper phthalocyanine derivative, well-known to those skilled in the art, to modify the stability to crystallization properties in the presence of solvents or the stability to flocculation properties. Suitable derivatives are described, for instance, in the French Pat. Nos. 2,278,740, 2,364,250, 2,128,493, 2,076,889, 1,332,175, and in the Belgian Pat. No. 615,287.

To obtain copper phthalocyanine pigments according to the invention, the fatty amine of formula (I) is introduced before or during the course of the grinding, without mineral substrate, of the raw copper phthalocyanine.

The raw copper phthalocyanine to be ground may be the direct product of the synthesis, for example, from phthalic anhydride or phthalodinitrile and may contain impurities resulting from the synthesis. If these impurities are inconvenient for the normal use of the pigment, they are eliminated by a treatment, known to those skilled in the art, subsequent to the grinding, which comprises, for example, treating the copper phthalocyanine with a dilute acid in a heated state, e.g. at a temperature of from 50° to 95° C. Suitable purification treatments for the elimination of impurities are taught in "Phthalocyanine Compounds" (Frank H. Moser & A. L. Thomas—Reinhold Pub. Corp.—page 152), the disclosures of which are incorporated herein by reference in their entireties.

The grinding is possibly achieved in the presence of an amine as defined above and one or more solvents characterized by their miscibility with water which must be at least 3% relative to water at any temperature between ordinary temperature and 100° C. As non-limiting examples, methanol, ethanol, propanol, isopropanol, butanol, isobutanol, pyridine, dimethylformamide and dimethyl sulfoxide may be mentioned.

The solvent content is between 1 and 10% by weight relative to pure copper phthalocyanine, but preferably 2 to 5% by weight; the overall content of amine plus solvent must not exceed 15% by weight.

The grinding may also be achieved in the presence of the amine and one or more non-volatile compound comprising a hydrocarbon chain of 6 to 22 carbon atoms and one or more polar functions for example, of the acid, alcohol, ester, amide, ketone or etheroxide type.

The content of non-volatile compound is between 1 to 10% by weight relative to pure copper phthalocyanine, but preferably 2 to 5% by weight; the overall content of amine plus non-volatile compound must not exceed 12% by weight.

According to the invention the grinding may be achieved in the presence of the amine and simultaneously of a solvent and non-volatile compound. In this case the total content of amine plus solvent plus non-volatile compound must not exceed 15% by weight relative to pure copper phthalocyanine.

The grinding is effected in any apparatus which permits dry or wet grinding; examples of these are the bar grinder, the vibrating grinder and the ball grinder.

In the case of a dry grinding, the grinding mass has the appearance of a powder which flows easily and which does not adhere to the walls of the grinder nor to the grinding elements, and this is of interest from a practical point of view.

The duration of the grinding depends upon the type of grinder and the charge in the apparatus, and varies from 2 to 60 hours according to these two parameters. In practice, for a given grinding apparatus, the influence of the grinding duration upon the coloristic yield of the final pigment is studied and a grinding duration is retained which achieves a good compromise between the energy to be expended for grinding and the coloristic yield of the final pigment which tends to increase with the grinding duration.

According to another embodiment of the invention, the fatty amine of formula (I) and possibly the non-volatile compound are incorporated with the phthalocyanine during the aqueous treatment which is intended to purify the copper phthalocyanine and is subsequent to the grinding.

What is novel and surprising in the invention is the possibility of obtaining copper phthalocyanine pigments which have both a relatively large specific surface area and a relatively high α form content.

In fact, on the one hand, it is known that the grinding of copper phthalocyanine, without mineral substrate, leads to highly agglomerated pigments with a specific surface area close to 10 m²/g or less and with a variable α form content according to the circumstances surrounding the grinding.

On the other hand, it is known that the crystallizing solvents introduced during the grinding permit the conversion of copper phthalocyanine from α form to β form.

The importance of a scarcely agglomerated copper phthalocyanine with an adequate specific surface area is apparent because the energy to be supplied to obtain in practice the coloring force will be less in the case of a scarcely agglomerated copper phthalocyanine.

The importance in practice of using a copper phthalocyanine containing a relatively high percentage of α form results from the properties in practice of the pigments obtained according to the invention. It is surprising to ascertain that these pigments, intended for the usual uses of pigments such as the coloration of inks, paints, plastics materials, textiles and leathers, have particularly remarkable coloristic properties in certain uses, particularly in liquid ink for publishing and conditioning in solvent paint; in these uses, the coloristic yield is generally greater than 10 to 20% relative to the commercialized conventional pigments without its being possible at the moment to formulate a hypothesis, to find an explanation for these gains in coloristic yield. Suitable processes for these uses are described in "Pigment Handbook" Vol. II edited by Temple C. Patton—John Wiley & Sons—1973 the disclosures of which are incorporated herein by reference in their entireties.

The pigments according to the invention are also intended for the coating of various substrates. Suitable processes for said coatings are described in "Pigment Handbook" Vol. II edited by Temple C. Patton—John Wiley & Sons—1973 the disclosures of which are incorporated herein by reference in their entireties.

The economic importance of the invention is also great; in fact, the processes which permit products according to the invention to be obtained comprise neither grinding with a mineral substrate, which reduces costs of materials and precludes saline pollution, nor treatment with large quantities of solvent, which also reduces the costs of materials and production costs.

The following examples, in which the parts indicated are parts by weight unless otherwise stated, illustrate the invention without limiting it.

EXAMPLE 1

In a laboratory bar grinder, 140 parts of copper phthalocyanine are ground for 24 hours immediately after synthesis; then, 5 parts of NORAM C are introduced, which is a mixture of amines with a mean molecular weight of 220, comprising 3% caprylylamine, 6% caprylamine, 56% laurylamine, 18% myristylamine, 10% palmitylamine, 2% stearylamine and 5% oleylamine; and the grinding is continued for 6 hours. The grinder is unloaded easily since the product, in the form of a powder, does not adhere to the walls.

In a control test, the grinding is continued for 30 hours without the introduction of amine.

The impurities contained in the phthalocyanine are eliminated by treating it with 1,000 parts by water and 200 parts of concentrated hydrochloric acid, for 2 hours at 90° C.

After drying, 110 parts of copper phthalocyanine pigment are recovered in the test case and 106 parts of pigment are recovered in the case of the control test.

For the purpose of use in toluene ink, 5 parts of a copper phthalocyanine derivative of the formula

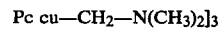

are incorporated with each pigment.

Physical properties of the pigments

|         | % of β form | Specific surface |
|---------|-------------|------------------|
| Control | 25%         | 11 m²/g          |
| Test    | 32%         | 25 m²/g          |

-continued

| | % of β form | Specific surface |
|---|---|---|
| Example 1 | | |

Preparation of toluene ink

In the Attritor, each pigment is dispersed for 45 mn at 400 tr/mn with 1,700 parts of steel balls with a diameter of 3.8 mm per 45 parts of pigment and 255 parts of varnish containing 60% toluene and 40% Shebelio 68139 resin (manufacturer: Sheby).

Use

The ink is diluted with 4.5-5-5.5% of pigment by adjusting the viscosity around 15 s at the section AFNOR No. 4 by varying the ratio of Shebelio 68139 varnish/toluene.

Printing on a helio Winstone machine at the rate of 40 m/mn.

Measuring the optical density by means of the MAC BETH densitometer with a red screen.

| | Results | |
|---|---|---|
| | Control Test | Test Example 1 |
| Optical Density Concentration | | |
| 4.5% | 1.67 | 1.78 |
| 5% | 1.77 | 1.86 |
| 5.5% | 1.83 | 1.93 |
| Vividness | Standard | greater |
| Shade | Standard | close |

Thus, a gain of approximately 10% coloristic yield is observed, evaluated from the optical densities. Visually, the gain in yield is close to 5%, and the difference between measuring and visual appreciation proceeds from the greater vividness of the test example. The test example is also approximately 5% stronger than the copper phthalocyanine pigments of β form which are usually encountered.

EXAMPLE 2

In a laboratory bar grinder, 140 parts of copper phthalocyanine are ground for 30 hours immediately after synthesis.

The impurities contained in the initial phthalocyanine are eliminated by treating it with 1,000 parts of water, 200 parts of concentrated hydrochloric acid and 5 parts of NORAM DMC, for 2 hours at 90° C. NORAM DMC is a mixture of amines of amines of the formula

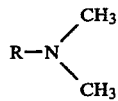

in which R represents $C_8H_{17}$ (3%), $C_{10}H_{21}$ (6%), $C_{12}H_{25}$ (56%), $C_{14}H_{29}$ (18%), $C_{16}H_{33}$ (10%), $C_{18}H_{37}$ (2%) and $CH_3-(CH_2)_7-CH=CH-(CH_2)_8-$ (5%).

After drying, 111 parts of pigment are recovered, with which 5 parts of Pc cu—$CH_2$—$N(CH_3)_2]_3$ are incorporated.

Physical properties of the pigments

| | % of β form | Specific surface |
|---|---|---|
| Control Test Example 1 | 25% | 11 m²/g |
| Test Example 2 | 30% | 19.9 m²/g |

Results in toluene ink

The ink is prepared and used as in Example 1.

| | Control test Example 1 | Test Example 2 |
|---|---|---|
| Optical density Concentration | | |
| 4.5% | 1.67 | 1.85 |
| 5% | 1.77 | 1.91 |
| 5.5% | 1.83 | 1.97 |
| Brightness | Standard | greater |
| Shade | Standard | slightly redder |

The gain in coloristic yield is approximately 20% evaluated from the optical densities, and approximately 10% evaluated visually. The same differences are observed with other resins, for example of the formophenol type.

EXAMPLE 3

In a laboratory bar grinder, 140 parts of copper phthalocyanine are ground for 24 hours immediately after synthesis; then, 5 parts of NORAM DMC and 5 parts of dimethylformamide are introduced and the grinding is continued for 6 hours. The grinder is easily unloaded since the product, in the form of a powder, does not adhere to the walls. The test is concluded as described in Example 1.

Physical properties of the pigments

| | % of β form | Specific surface |
|---|---|---|
| Control test Example 1 | 25% | 11 m²/g |
| Test Example 3 | 36% | 40 m²/g |

Results in toluene inks

Analogous with those obtained with the test of Example 2.

Examination in nitrocellulose ink

Preparation of the ink

In the Attritor, the pigment is dispersed for 45 minutes at 400 tr/mn with 1,700 parts of balls with a diameter of 3.8 mm per 30 parts of pigment and 270 parts of varnish comprising 15% Chips Nitro 16405 (manufacturer: NOBEL BOZEL S.A.), 42.5% ethanol and 42.5% ethyl acetate.

Dilution of the ink with 4.5-5-5.5% of pigment with a 50/50 mixture of ethanol and ethyl acetate and with the varnish so as to have a discharge time of 15 s at the section AFNOR No. 4.

Compared with a conventional copper phthalocyanine pigment of β form, the test leads to a coloristic yield greater than 5 to 10% by visual evaluation, of a redder shade, and this renders the use of the optical density ineffective.

EXAMPLE 4

In a laboratory bar grinder, 140 parts of copper phthalocyanine are ground for 24 hours immediately after synthesis; then, 5 parts of NORAM DMC and 5 parts of oleic acid are introduced, and the grinding is continued for 6 hours. The grinder is unloaded easily since the product, in the form of a powder, does not adhere to the walls.

After the impurities contained in the initial phthalocyanine have been eliminated, according to the circumstances in Example 1, 115 parts of pigment are recovered and the test is concluded as in Example 1.

Physical properties of the pigments

|  | % of β form | Specific surface |
|---|---|---|
| Control test Example 1 | 25% | 11 m$^2$/g |
| Test Example 4 | 66% | 22 m$^2$/g |

Results in toluene ink

Analogous with those obtained with the test of Example 2.

EXAMPLE 5

In this example, all the grinding phase is identical to that in Example 3.

The contents of the grinder are poured into 1,000 parts of water at 90° C. containing 1.5 parts of glacial acetic acid. An aqueous dispersion of 10 parts of —SO$_3$Na copper phthalocyanine is introduced, then 200 parts of concentrated hydrochloric acid are introduced; after the mixture has been maintained at 90° C. for 2 hours and filtered and the product has been dried, 119 parts of pigment are recovered and the pigment is examined in solvent paint.

The physical properties of the pigment are close to those of the pigment in Example 3, with, however, a specific surface which is slightly greater (48 m$^2$/g) in the case of Example 5.

Preparation of a solvent paint (alkyd oven)

In a Sussmeyer laboratory, the pigment is dispersed with 900 parts of glass balls with a diameter of 3 mm per 80 parts of pigment and 330 parts of resin composed of 60% Xylene and 40% Glyalkyd AGS 30×75 (manufactured by Plastimer)

A sample of 5 parts is taken which is diluted, with stirring, with 80 parts of Glyalkyd AGS 30 M1 (manufactured by Plastimer).

10 parts of the previously obtained colored suspension are mixed with 20 parts of white paint composed of 67% titanium oxide and 33% Glyalkyd AGS 30. Use on white paper inserted with a rod having a thickness of 150μ.

Oven-dried at 125° C. for 30 minutes.

Results in alkyd oven paint

Used instead of a commercial β copper phthalocyanine, the pigment obtained according to Example 5 has greater vividness, a slightly greener shade and a coloristic yield greater than 10%.

EXAMPLE 6

In a laboratory bar grinder, 140 parts of copper phthalocyanine having 3% chlorine are ground for 32 hours immediately after synthesis. Then, 5 parts of NORAM DMC and 5 parts of dimethylformamide are introduced, and the grinding is continued for 8 hours. The grinder is unloaded easily since the product, in the form of a powder, does not adhere to the walls. The impurities contained in the initial copper phthalocyanine are eliminated by treating it with 1,000 parts of water and 200 parts of concentrated hydrochloric acid, for 2 hours at 90° C.

After drying, 111 parts of pigment are recovered.

A control test comprising a grinding of 40 hours without amine permits 107 parts of pigment to be obtained.

Physical properties

|  | % of β form | Specific surface |
|---|---|---|
| Test Example 6 | 8% | 29 m$^2$/g |
| Control test | 3% | 12 m$^2$/g |

Use in toluene ink

The circumstances for the preparation and use of the ink are those described in Example 1.

For the test of Example 6, a greater vividness and a 10% greater yield compared with the control test are observed.

EXAMPLE 7

In a laboratory bar grinder, 140 parts of copper phthalocyanine having 3% chlorine are ground for 40 hours immediately after synthesis.

The impurities contained in the initial phthalocyanine are eliminated by treating it with 1,000 parts of water, 200 parts of concentrated hydrochloric acid and 5 parts of NORAM DMC for 2 hours at 90° C.

After drying, 112 parts of pigment are recovered.

Physical properties of the pigments

|  | % of β form | Specific surface |
|---|---|---|
| Control test Example 6 | 3% | 12 m$^2$/g |
| Test Example 7 | 5% | 21 m$^2$/g |

Use in alkyd oven paint

The circumstances for the preparation and use of the paint are those described in Example 5.

A greater vividness and a 5% greater yield are noted for the test compared with the control.

EXAMPLE 8

In a laboratory bar grinder, 140 parts of copper phthalocyanine are ground for 24 hours immediately after synthesis; then, 3 parts of NORAM DMC and 4 parts of isobutanol are introduced, and the grinding is continued for 6 hours. The grinder is unloaded easily since the product, in the form of a powder, does not adhere to the walls.

After the impurites have been eliminated and the stabilizer has been incorporated as in Example 1, 108 parts of pigments are recovered.

|  | % of β form | Specific surface |
|---|---|---|
| Test Example 8 | 34% | 44 m²/g |

Use

Used in nitrocellulose ink according to the process described in Example 3, the pigment thus obtained has coloristic properties analogous with those of the pigment of Example 3.

EXAMPLE 9

The operation is conducted in the same conditions as in Example 8, except that the 3 parts of NORAM DMC and the 4 parts of isobutanol are replaced by 5 parts of DINORAM C and 5 parts dimethylformamide. DINORAM C is a mixture of amines of the formula $R_1$—NH—$CH_2$—$CH_2$—$CH_2$—$NH_2$, in which $R_1$ represents $C_8H_{17}$ (3%), $C_{10}H_{21}$ (6%), $C_{12}H_{25}$ (56%), $C_{14}H_{29}$ (18%), $C_{16}H_{33}$ (10%), $C_{18}H_{37}$ (2%) and $CH_3$—$(CH_2)_7$—$CH=CH$—$(CH_2)_8$— (5%).

Physical properties of the pigment

|  | % of β form | Specific surface |
|---|---|---|
| Test Example 9 | 28% | 35 m²/g |

Use

The obtained pigment has, in toluene ink, properties analogous with those of the pigment obtained in Example 1.

EXAMPLE 10

The operation is conducted under the same conditions as in Example 8, except that the 3 parts of NORAM DMC and the 4 parts of isobutanol are replaced by 4 parts of NORAM DMC, 3 parts of dimethylformamide and 3 parts of oleic acid.

Physical properties of the pigment

|  | % of β form | Specific surface |
|---|---|---|
| Text Example 10 | 42% | 31 m²/g |

Use

The obtained pigment has, in toluene ink, properties analogous with those of the pigment obtained in Example 1.

EXAMPLE 11

The operation is conducted under the same conditions as in Example 8, except that the 3 parts of NORAM DMC and the 4 parts of isobutanol are replaced by 7 parts of NORAM DMC.

Physical properties of the pigment

|  | % of β form | Specific surface |
|---|---|---|
| Test Example 11 | 30% | 59 m²/g |

Use

The obtained pigment has, in toluene ink, properties analogous with those of the pigment obtained in Example 1.

EXAMPLE 12

In this example, the operation is conducted as in Example 1, except that the product obtained after acid treatment for the purpose of eliminating the impurities is kept in paste form instead of being dried. After 5 parts of Pc-cu—$CH_2$—$N(CH_3)_2]_3$ have been incorporated, a paste is obtained having 65% of dry extract which is used as such for the coloration of a toluene ink according to the same procedure as that described in Example 1. The presence of a small quantity of water is not inconvenient for this use, and coloristic properties are obtained which are close to those obtained in Example 1.

What is claimed is:

1. Process for the preparation of a copper phthalocyanine pigment which comprises grinding a grinding mass consisting essentially of raw copper phthalocyanine without mineral substrate and incorporating either:
  (1) before or during the grinding:
    (a) 0.5 to 10% by weight of at least one fatty amine of formula (I):

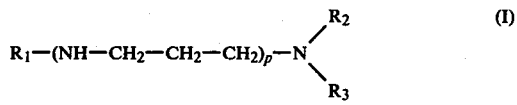

in which $R_1$ represents a non-aromatic, $C_1$ to $C_{22}$ aliphatic or alicyclic hydrocarbon chain, $R_2$ represents hydrogen or a non-aromatic, $C_1$ to $C_{22}$ aliphatic or alicyclic hydrocarbon chain, the sum of the carbon atoms of chains $R_1$ and $R_2$ is between 6 and 50, $R_3$ represents hydrogen or a $C_1$ to $C_4$ aliphatic radical, and p is a number from 0 to 20;
    (b) said fatty amine and 1 to 10% by weight relative to pure copper phthalocyanine of at least one solvent whose miscibility with water is at least 3% at a temperature between ordinary temperature and 100° C., the overall content of amine and solvent not exceeding 15% by weight;
    (c) said fatty amine and 1 to 10% by weight relative to pure copper phthalocyanine of at least one non-volatile compound comprising a hydrocarbon chain of 6 to 22 carbon atoms and one or more polar functions, the overall content of amine and non-volatile compound not exceeding 12% by weight; or
    (d) said fatty amine, said solvent and said non-volatile compound, the overall content of amine, solvent and non-volatile compound not exceeding 15% by weight, and eventually treating the mass in aqueous medium to eliminate impurities; or
  (2) after the grinding and during an aqueous treatment to purify the copper phthalocyanine:

(a) 1 to 10% by weight of at least one fatty amine of said formula (I); or (b) said fatty amine and 1 to 10% by weight of at least one non-volatile compound.

2. Process according to claim 1 which comprises incorporating said amine and said solvent.

3. Process according to claim 2 wherein from 2 to 5% by weight of solvent is added.

4. Process according to claim 2 wherein the solvent is methanol, ethanol, propanol, isopropanol, butanol, isobutanol, pyridine, dimethylformamide or dimethylsulfoxide.

5. Process according to claim 1 which comprises incorporating said amine and said non-volatile compound.

6. Process according to claim 5 wherein 2 to 5% of non-volatile compound is added.

7. Process according to claim 5 wherein the non-volatile compound is oleic acid, stearic acid, lauric alcohol, cetyl alcohol, glycerol or glycerol stearate.

8. Process according to claim 1 which comprises incorporating said amine, said solvent and said non-volatile compound.

9. Copper phthalocyanine pigment produced according to the process of claim 1 having a specific surface according to BET of between 15 and 65 m$^2$/g and a $\beta$ form content, determined by X-ray analysis, of between 3 and 85%, said pigment containing up to 10% of said fatty amine or mixture of fatty amines of formula (I).

10. Pigment according to claim 9 wherein the copper phthalocyanine is a non-halogenated copper phthalocyanine.

11. Pigment according to claim 9 wherein the copper phthalocyanine is a halogenated copper phthalocyanine whose maximum halogen content is 5%.

12. Pigment according to claim 10 or 11 wherein, in formula (I), p is between 0 and 4.

13. Pigment according to claim 9 wherein, in formula (I), p is between 0 and 4.

14. Pigment according to claim 9 which contains 1 to 10% by weight relative to pure copper phthalocyanine of at least one non-volatile compound comprising a hydrocarbon chain of 6 to 22 carbon atoms and one or more polar functions, the overall content of amine plus non-volatile compound not exceeding 12%.

15. Pigment according to claim 14 which contains 2 to 5% of said non-volatile compound.

16. Pigment according to claim 9 or 14 which contains a copper phthalocyanine derivative which gives the composition a better stability towards solvents and a better fastness to flocculation.

17. Process which comprises using the pigments according to claim 9 for the coloration of inks, paints, plastics materials, textiles and leathers.

18. Process which comprises using the pigments according to claim 9 for the coating of various substrates.

* * * * *